United States Patent [19]

Mosher et al.

[11] Patent Number: 4,614,888
[45] Date of Patent: Sep. 30, 1986

[54] IMPROVED MAGNETIC ROTOR

[75] Inventors: Philip C. Mosher, Rockford; Mohd A. Aleem, Roscoe, both of Ill.

[73] Assignee: Sundstrand Corporation, Rockford, Ill.

[21] Appl. No.: 759,213

[22] Filed: Jul. 26, 1985

Related U.S. Application Data

[62] Division of Ser. No. 523,924, Aug. 17, 1983, Pat. No. 4,562,641.

[51] Int. Cl.⁴ ............................................. H02K 1/22
[52] U.S. Cl. .................................... 310/261; 310/270
[58] Field of Search ................ 310/42, 194, 261, 262, 310/270, 260, 216–218

[56] References Cited

U.S. PATENT DOCUMENTS

| | | | |
|---|---|---|---|
| 935,397 | 9/1909 | Nikonow | 310/270 UX |
| 1,249,152 | 12/1917 | McKeown | 310/42 X |
| 2,632,123 | 3/1953 | Kober | 310/261 X |
| 2,927,229 | 3/1960 | Merrill | 310/42 X |

*Primary Examiner*—Donovan F. Duggan

*Attorney, Agent, or Firm*—Wood, Dalton, Phillips, Mason & Rowe

[57] ABSTRACT

A high speed shaftless rotor construction is disclosed including a method of sequentially building up the rotor to facilitate disassembly for reworking and maintaining precise alignment of the reassembled elements. End turn supports are matched and preliminarily assembled with bolts to the core and the parts machined to achieve desired tolerances. After machining, the end turn supports are separated from the core, matched with end shaft fittings and additional machining carried out, after which the turn supports are separated from the end shaft fittings and reattached with the core. The shaft fittings are realigned with the assembled end support fittings and bolted into position after which final machining can be completed. All elements are then disassembled and the parts deburred and cleaned to eliminate any contamination prior to winding the field coil. After reassembly, winding of the field core and completion of the electrical connections, a cylindrical sleeve is disposed over the main core assembly and conventionally joined to effect a rigid structural rotor member capable of withstanding high speeds.

5 Claims, 6 Drawing Figures

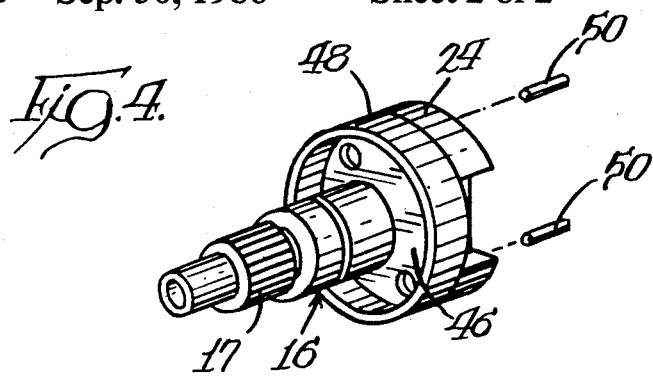
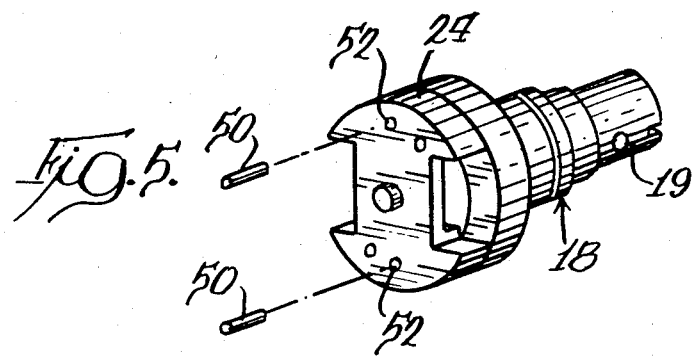
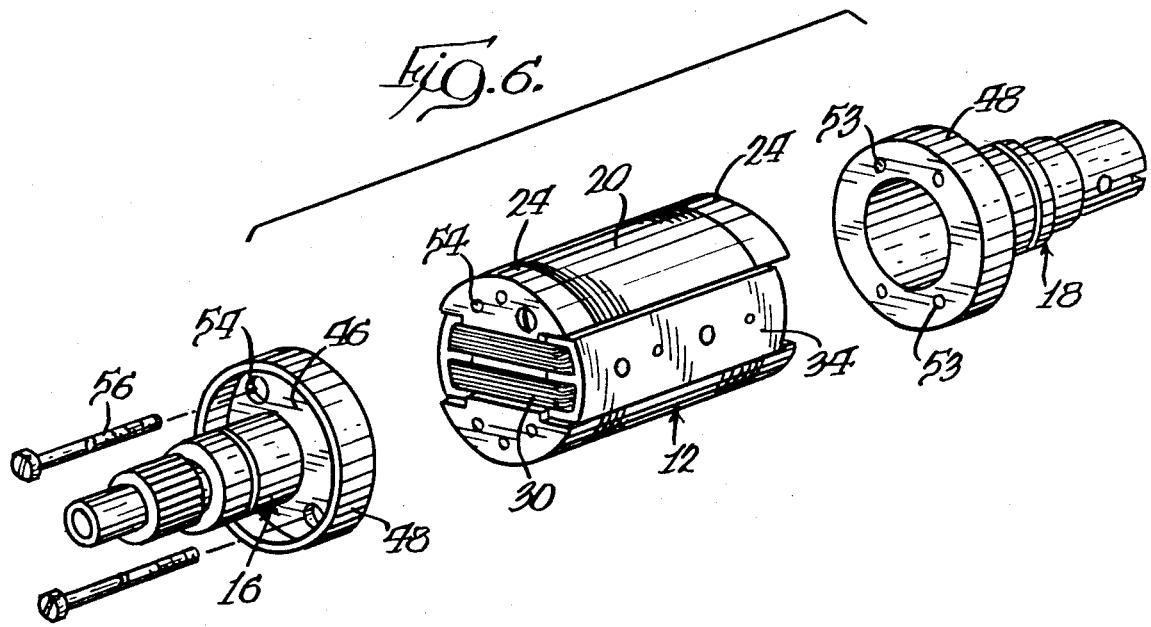

IMPROVED MAGNETIC ROTOR

This is a division of application Ser. No. 523,924 filed Aug. 17, 1983 U.S. Pat. No. 4,562,641.

DESCRIPTION

1. Technical Field

This invention relates to rotors for use in electrical generators and more particularly to a sequentially built rotor and a method of assembly.

2. Background Art

High speed, high performance generator rotors are generally built without center shafts to provide maximum magnetic material. To maintain the structural integrity of this type rotor, one possible course is to complete the rotor and associated shafts as a unit, as taught in U.S. Pat. No. 4,024,628, to Crites. However, because the rotor assembly is an integral unit, any defect or failure in any portion of the rotor renders the entire structure useless.

As an alternative to a single piece construction, rotors may be sequentially built up and the parts permanently joined as by welding. The welding operation is intricate and demands a great amount of care and precision. This necessarily results in a time-consuming process and the performance of a great number of steps. Further reworking of the rotor is precluded by the welded joints.

A rotor assembled with bolts or rivets generally has one main drawback. To withstand the large stresses encountered, large bolts or rivets must be used requiring large bores through the assembled elements. The possibility of air gaps about the fastener raises the problem of disruption of the magnetic path which, in turn, lowers generator efficiency.

A further drawback with sequentially built rotors is that contaminants are likely to find their way between mated parts, which may be permanently engaged. Rotor operation may be impaired. Because the parts are not readily separable, the entire rotor may be unusable.

The present invention is directed to overcoming the problems enumerated above.

DISCLOSURE OF THE INVENTION

The present invention comprises a sequentially built rotor and a method of assembling the rotor elements which basically are a rotor core, longitudinally spaced end turn supports, and end shaft fittings.

According to the present invention, the end turn supports are aligned at the axial ends of an unwound core to complete a core subassembly and the subassembly bored to close tolerances for reception of lengthwise clamping bolts. With the subassembly intact, machining as desired is carried out. The end turn supports are then removed from the core and matched to the end shaft fittings and additional machining performed as required. The end supports are separated from the shaft fittings and rebolted to the core. The shaft fittings are in turn connected to the core subassembly by boring additional axial holes to close tolerances for bolting. Final machining of the rotor, main field winding and completion of electrical connections then occurs. A sleeve is placed over the completed assembly to provide a rigid structural member.

The present invention has as one of its principal objectives the provision of a rigid rotor that is capable of high rotational speeds and which can be disassembled for reworking without loss of precise alignment between elements.

Upon removal of the sleeve housing, the elements can be successively separated by releasing the bolts joining the end shaft fittings and in turn those mounting the end turn supports with the core. This feature is particularly advantageous in that it permits precise machining in various stages of assembly after which the entire assembly can be disassembled, deburred and cleaned to remove contaminants as machining chips, grinding dust, etc. prior to winding the field coil.

While the process facilitates assembly and disassembly, the end product of the process is a high quality structure. The bores for the bolts are machined to close tolerances. The bolts employed are precision ground, high strength, high permeability bolts which become part of the final assembly and positively retain the elements. Further, the bolts, which are selected for high magnetic permeability, account for low magnetic loss.

BRIEF DESCRIPTION OF THE DRAWINGS

FIG. 4 is an end shaft fitting for the core matched with an end turn support;

FIG. 5 is the opposite end shaft fitting from that in FIG. 4 matched with an end turn support; and FIG. 6 is an exploded view of the end shaft fittings and field wound core subassembly.

BEST MODE FOR CARRYING OUT THE INVENTION

Figure 1:
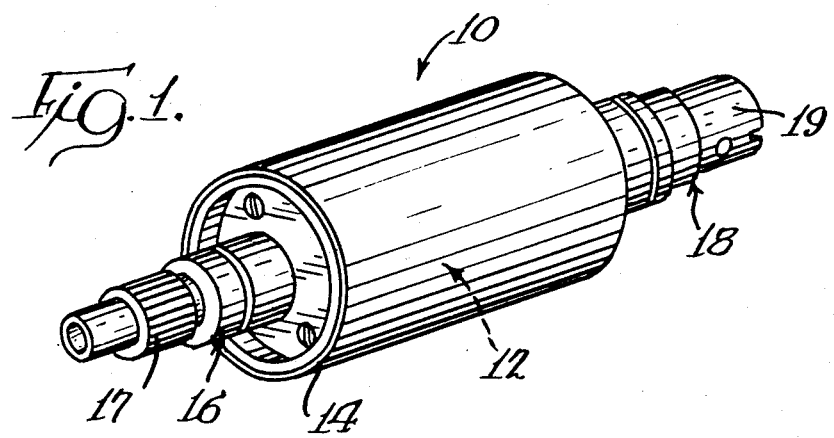
FIG. 1 is a perspective view of a completed rotor assembly according to the present invention.

FIG. 1 depicts a completed rotor assembly 10 made according to the invention and comprising generally a main core assembly 12 surrounded by a cylindrical sleeve 14 and oppositely directed and axially aligned end shaft fittings 16, 18.

Figure 2:
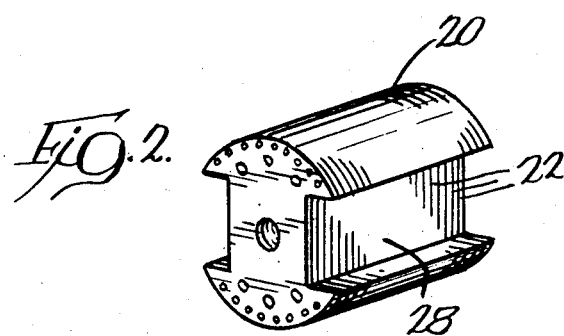
FIG. 2 is a perspective view of the rotor core.
Figure 3:
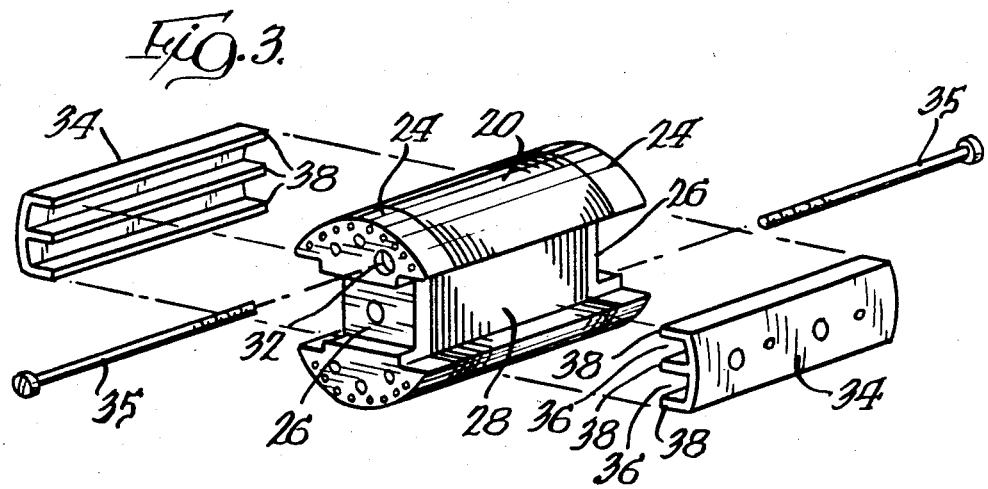
FIG. 3 is an exploded view of the core assembly with mated end turn supports.

The main core assembly 12 is detailed in FIGS. 2 and 3 and comprises an I-shaped core 20 made from bonded lamination layers 22. At each end of the core 20 is an end turn support 24 configured to nominally match the cross section of the core 20. The end turn supports 24 have axially oppositely opening rectangular recesses 26 which, with oppositely opening rectangular recesses 28 in the core 20 and end turn supports 24, provide a continuous undercut about the main core assembly 12, for the inclusion of the field windings 30 (FIG. 6).

A bore 32 is axially machined to close tolerances through each of the end turn supports 24 and the core 20 and threadably receives a bolt 35. A single bolt 35 is inserted axially through each end turn support at substantially diametrically opposing regions of the core assembly 12 and is of sufficient length to extend into the opposite end turn support 24 so as to prohibit relative rotation between the core 20 and end turn supports 24.

M-shaped wedges 34 are closely mated in the core recesses 28, and have lengthwise, rectangular pathways 36 for the field windings 30 defined by spaced axial flanges 38 of a length equal to the distance between opposed faces of the end turn supports 24.

Machining of the core 20 and assembled end turn supports 24 constituting the core subassembly 12, can take place before the addition of the wedges 34. The wedges 34 are assembled to the core 20 by suitable fasteners (not shown) before completion of the final machining of the outside diameter thereof.

The end turn supports 24 are then removed from the core and matched with the end shaft fittings 16, 18 illustrated in FIGS. 4 and 5. Because the matching of the end turn supports 24 is the same for both end shaft fittings 16, 18, like reference numerals are used to designate parts at each end of the core. Each of the end shaft fittings 16, 18 has a circular cast base 46 with an integrally formed, axially directed collar 48. The collars are concentric with the rotational axis of shafts 17,19 which are integral with and extend oppositely from the bases 46.

Alignment between the end turn supports 24 and shaft fittings 16, 18 is maintained by a pair of dowels 50 extending within diametrically opposed axial bores 52 and 53 in the end turn supports 24 and in the bases 46, respectively. When properly matched, the end turn supports 24 and end shaft fittings 16, 18 are machined to desired tolerances.

The end shaft fittings 16, 18 and end turn supports 24 are then separated and the and supports 24 rebolted with the core 20. The shaft fittings 16, 18 and core assembly 12 are mated as illustrated in FIG. 6. Bores 54 are machined to close tolerances through the bases 46, the end turn supports 24 and into the core 20. A second set of precision ground bolts 56 are threadably received in the bores 54 and are tightened to secure the end shaft fittings 16,18, to the core subassembly. Additional machining of the collars 48 and the end turn supports 24 proceeds if required.

Bolts 56 and end turn bolts 34 are then withdrawn so that all the aggregate elements can be separated, deburred and cleaned to remove any machining chips or grinding dust or any other contamination that may have accumulated.

The end turn supports 24 are then reassembled to the core 20, the field coil 30 wound and the wedges 34 replaced. The shaft fittings 16,18 are then reassembled to the end turn supports 24 after such reassembly. The cylindrical sleeve 14 is interference fit with the peripheral surfaces of the commonly machined core, end turn supports and end shaft fittings and secured in a conventional manner to complete the rotor 10.

From the foregoing it can be seen that the bolts 35, 56 simply and positively maintain the core 20, end turn supports 24 and end shaft fittings 16, 18 in assembled relationship. By simply releasing in turn bolts 56 and 35, the core 20 end turn supports 24 and end shaft fittings 16, 18 can be freed to accomplish cleaning reworking or replacement of parts.

Precise alignment of the core end turn supports and end shaft fittings during reassembly is assured by the bolts 35, 56.

Because bolts 35, 56 and the receiving bores 32, 54 are machined to close tolerances, air gaps are minimized so that little disruption of the magnetic path occurs. Generator efficiency is further enhanced by the use of bolts with high magnetic permeability which accounts for reduced magnetic loss in the rotor.

We claim:

1. A built-up rotor for an electric machine comprising:
    a main rotatable core having a lengthwise rotational axis and spaced ends each having substantially the same cross-sectional configuration;
    two end turn supports each with a cross-sectional configuration substantially matched to the cross section of the spaced core ends;
    means removably securing an end turn support at each axial end of the core to form a core subassembly;
    two end shaft fittings;
    means removably securing an end shaft fitting to each of the end turn supports; and
    a sleeve positionable over the core subassembly.

2. The built-up rotor of claim 1 wherein the means removably securing each end shaft fitting with an end turn support comprises at least one bolt extending axially through each end shaft fitting, an end support and into the core.

3. The built-up rotor of claim 1 wherein said core and end turn supports each have a peripheral surface and said core and end turn supports are commonly machined so that the peripheral surfaces define common cylinders over which the sleeve is positioned.

4. The built-up rotor of claim 1 wherein said core and end shaft fittings each have a peripheral surface and said core and end shaft fittings are commonly machined so that the peripheral surfaces define common cylinders over which the sleeve is positioned.

5. The built-up rotor of claim 3 wherein the sleeve comprises a single piece and is interference fit with the peripheral surfaces of the core and end turn support.

* * * * *